United States Patent

Moll et al.

[11] 3,860,081
[45] Jan. 14, 1975

[54] DRIVE SYSTEM FOR MOTOR VEHICLES, PARTICULARLY FOR TRUCK-TRAILER AND TRUCK SEMI-TRAILER COMBINATIONS

[75] Inventors: Hans Moll; Hans Hagen, both of Munich, Germany

[73] Assignee: Maschinenfabrik Augsburg-Nurnberg Aktiengesellschaft, Munich, Germany

[22] Filed: Aug. 22, 1973

[21] Appl. No.: 391,153

[52] U.S. Cl. ............................ 180/14 A, 180/44 E
[51] Int. Cl. ............................................. B60d 1/08
[58] Field of Search ............... 180/44 E, 65 A, 14 A

[56] References Cited
UNITED STATES PATENTS

| | | | |
|---|---|---|---|
| 3,171,505 | 3/1965 | Imelmann | 180/44 E X |
| 3,205,965 | 9/1965 | Roth | 180/65 A |
| 3,421,596 | 1/1969 | Christenson et al. | 180/44 E |

*Primary Examiner*—M. Henson Wood, Jr.
*Assistant Examiner*—Gene A. Church
*Attorney, Agent, or Firm*—Breitenfeld & Levine

[57] ABSTRACT

A drive system for a truck and trailer combination including an internal combustion engine driving an electric generator. A plurality of axle-motor units are provided, each formed as a unitary assembly including an axle and at least one electric motor. The electric motors are energized by the generator and serve to drive the wheels of the truck and trailer combination. The engine may be a single shaft gas turbine.

4 Claims, 3 Drawing Figures

PATENTED JAN 14 1975

3,860,081

DRIVE SYSTEM FOR MOTOR VEHICLES, PARTICULARLY FOR TRUCK-TRAILER AND TRUCK SEMI-TRAILER COMBINATIONS

This invention relates to a drive system for motor vehicles, particularly for truck-trailer and truck-semitrailer combinations with an internal combustion engine whose driving power is transformed into electric power, in a generator mounted on the vehicle.

In known drive systems of the aforementioned type, the motor vehicle is driven from an internal combustion engine by way of mechanical and hydraulic gears which actuate one or more drive axles. In truck-trailer combinations this means that only a relatively small percentage of the total weight is contained in the axial load of the drive axles. Therefore, the driving power can be transmitted to the road to a limited extent only, especially when, e.g., the tractor of a truck-trailer combination bears a smaller load than the trailer, or the conditions of friction on the road are unfavorable. Since the engine brake acts likewise only by way of drive axles, driving safety is also impaired when the drive axles are loaded only with a fraction of the total weight of the vehicle. In most cases the high structural expense in mechanical drive systems is not put up with, and resort is taken to the uniaxial drive of a tractor. Especially in these case, a further disadvantage of conventional drive systems with a high driving power transmitted to the road by way of a single axle consists in a strong frictional wear. Besides, the driving safety of such vehicles is reduced since, due to the high demands made on the frictional force of the wheels, this single axle is left, on account of driving forces, with only limited frictional forces for the lateral guidance of the vehicle.

Because of the prevailing tendency to install higher driving power in road vehicles, such conditions are going to be still more unfavorable in the future.

The object of this invention is to overcome the aforementioned defects and to create a drive system for motor vehicles, particularly for truck-trailer and truck-semitrailer combinations in which the total driving power available is distributed, while a justifiable expense is observed, to as many vehicle axles as possible, corresponding to their loads.

According to this invention, the proposed solution of this problem consists in distributing the electric driving power to several electric motors which drive the individual wheels of the tractor and of the trailers or semi-trailers.

The drive system of this invention has the advantage in that the entire available power is absorbed, as electric power, by the generator, whereby it can be distributed in the simplest manner to many electric motors, each driving one wheel of the vehicle.

In truck-trailer and truck-semitrailer combinations, the advantage of this drive system apply in a very special manner, since in conventional drive systems multiple-axle truck combinations a distribution of the driving power to the individual drive axles at a justifiable expense was nearly impossible. Whereas, in the drive system of this invention only a cable connection from the main generator of the truck-trailer combination to the individual drive motors of the axles needs to be provided for the distribution of the driving power. Especially a distribution of the driving and braking power also to the trailers or semitrailers results furthermore in increased driving safety since, in a continuous braking of the truck-trailer combination by means of the engine brake, the brakes are also applied to the trailer or supporting axles and thus the danger that the truck-trailer combination may jack-knife is eliminated.

In an embodiment of the drive system of this invention, a single-shaft gas turbine is used as the internal combustion engine. A single-shaft gas turbine offers the advantage of a very simple structure and, consequently, of a very economical manufacture. Besides, in a single-shaft gas turbine it is possible to utilize, without additional devices, the strong braking effect of the compressor in the thrust operation of the vehicle. In the drive system of this invention with a single-shaft gas turbine, the drive axle electric motors operate as generators, feed their current to the generator which, in this mode of operation, operates as a motor and drives a gas turbine, in which operation the compressor consumes the power. The power is completely transformed into heat and discharged with the exhaust air so that no cooling problems arise. The braking power capacity amounts in this operation to about twice or three times the useful effect of the single-shaft gas tubrine.

In a further development of this invention, the electric motors serving as drive motors are constructed as hub wheel motors. By means of this construction any power transmission mechanism is saved and the driving power is transmitted immediately from the spot of its origin to the drive wheels.

In a further development of this invention, the vehicle axles with built-in electric motors are constructed as complete exchange units, readily detachable from the vehicle.

Since such exchange axles, so-called "dolly-axles", must, in addition to the regular joints by which any nondriven axle is connected with the vehicle frame, be provided with a single plug-in type cable connection to supply power to the drive motors, such exchange axles permit the greatest freedom in the arrangement of the drive mechanism and drive axles in the vehicle. A further advantage of these exchange units consists in that in the loading and unloading of trailers and semitrailers, such trailers or semitrailers can be placed upon running axles or supports, and the drive axles, to be utilized otherwise during the loading and unloading period, are detached from the vehicle concerned and are employed, in the manner of dolly axles, attached to a tractor, as drive axles in other trailers or semitrailer to be transported.

In a further development of the drive system of this invention, vehicle axles constructed as complete exchange units, may be provided with a unit driving power and a load bearing capacity adapted thereto. This results in the advantage that by making a greater number of the drive axles to be produced, a more economical manufacture is achieved. For instance, in a truck-trailer combination that needs a total driving power of 400 metric horsepower, four drive axles of 100 metric horsepower each are used. Merely by way of example, a particularly economical application of the drive system of this invention in a truck-trailer combination may be pointed out. According to this, the tractor of the truck-semitrailer combination is provided with a non-driven, steered front axle and a unit drive axle. The semitrailer is provided with a non-driven running axle and, depending on the useful load to be conveyed, with one or two additional exchangeable drive axles.

This invention is described more fully with reference to the accompanying schematic drawings, in which.

Figure 1:
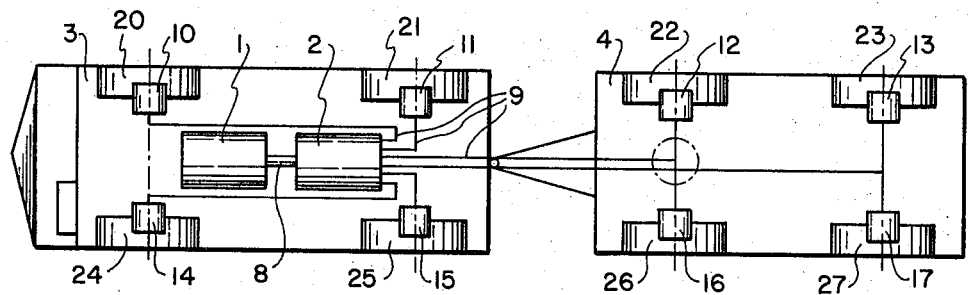
FIG. 1 is a plan view of a truck-trailer combination consisting of a tractor and biaxial trailer.

In FIG. 1 a tractor 3 has wheels 20, 21, 24 and 25 and to which a trailer 4 with wheels 22, 23, 26 and 27 is attached. An internal combustion engine 1, preferably a single-shaft gas turbine, drives by way of a clutch 8 an electric generator 2, mounted on the tractor 3. From the generator 2 electric lines 9 lead to wheel hub motors 10, 11, 14 and 15 for the wheels of the tractor 3, and further electric lines 9 lead to wheel hub motors 12, 13, 16 and 17 of the trailer 4.

Figure 2:
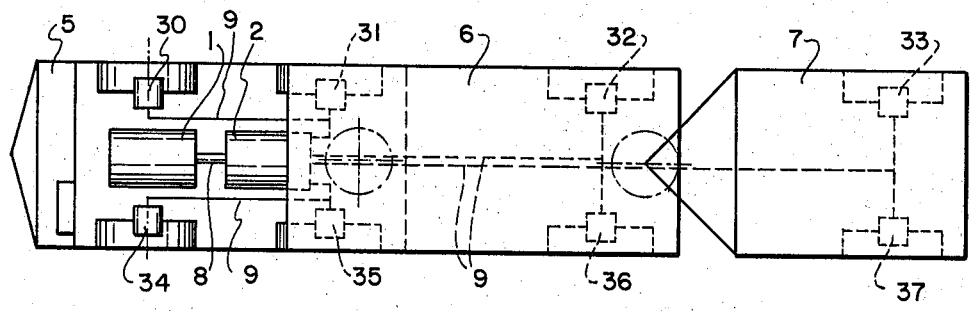
FIG. 2 is a plan view of a truck-semitrailer combination, consisting of a tractor, a first uniaxial semitrailer and a second uniaxial semitrailer.

In FIG. 2 a biaxial tractor 5 is shown. A uniaxial semitrailer 6 is attached to tractor 5 and to which semitrailer 6 a second semitrailer 7 is attached. Again, an internal combustion engine 1 is mounted on the tractor 5, which engine 1 drives by way of a clutch 8 a generator 2 which electric lines 9 lead to wheel hub motors 30, 31, 34 and 35 on the tractor 5, to the wheel hub motors 32 and 36 of the first semitrailer 6, and to the wheel hub motors 33 and 37 of the second semitrailer 7.

Figure 3:
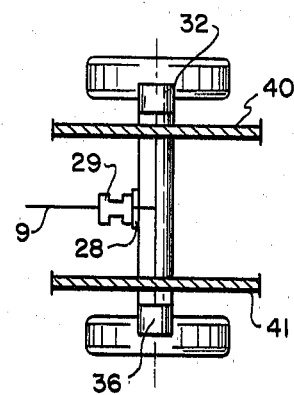
FIG. 3 is a plan view, partly in cross-section, of a complete vehicle axle constructed as a complete exchange unit with electric motors.

FIG. 3 shows a vehicle axle constructed as a complete exchange unit. Such an axle can be used in the tractors 3 and 5 as well as in the trailer 4 and in the semitrailers 6 and 7 of FIGS. 1 and 2. The vehicle axle is equipped with wheel hub motors 32 and 36 from which electric lines lead to a bushing 28 in the middle of the axle. A plug 29, detachably connected to the bushing 28 of the vehicle axle, is connected to an electric line 9, which originates at the generator 2. The vehicle axles can be connected, at the ends of leaf springs or corresponding axle guides 40, 41, to the vehicles concerned.

Having now described the means by which the objects of this invention are obtained,

We claim:

1. A drive system for a truck and trailer or semitrailer combination requiring more than two axles, comprising:
   a. an internal combustion engine,
   b. an electric generator arranged to be driven by said engine,
   c. a plurality of axle-motor units, each unit including an axle and at least one electric motor, each of said axle-motor units being formed as a unitary assembly which can be incorporated in the truck and trailer combination so that the motor drives a wheel of the combination, and which can be removed as a unitary assembly and replaced by another similar unit or by an axle having no motor associated with it, and
   d. means for transmitting electricity from said generator to said motors.

2. A drive system as defined in claim 1 wherein said electricity-transmitting means includes electric cables, and a readily separable plug and receptacle between each cable and one of said axle-motor units.

3. A drive system as defined in claim 1 wherein said internal combustion engine is a single shaft gas turbine.

4. A drive system as defined in claim 1 wherein the driving power of the electric motor of each of said axle-motor units is related to the load-bearing capacity of the axle of that unit so that the motor power of each axle-motor unit is sufficient to drive the load capable of being supported by its axle.

* * * * *